(12) United States Patent
Bigelow

(10) Patent No.: US 7,469,864 B2
(45) Date of Patent: Dec. 30, 2008

(54) METHOD FOR ASSEMBLYING AND LANDING A HABITABLE STRUCTURE ON AN EXTRATERRESTRIAL BODY

(75) Inventor: Robert Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 414 days.

(21) Appl. No.: 11/363,346

(22) Filed: Feb. 28, 2006

(65) Prior Publication Data

US 2007/0200033 A1 Aug. 30, 2007

(51) Int. Cl.
*B64G 1/00* (2006.01)
(52) U.S. Cl. .............. 244/158.1; 244/158.3; 244/159.4
(58) Field of Classification Search ............. 244/158.1, 244/158.3, 159.4, 159.5, 159.6
See application file for complete search history.

(56) References Cited

U.S. PATENT DOCUMENTS

| | | | |
|---|---|---|---|
| 4,728,060 A * | 3/1988 | Cohen | 244/159.4 |
| 5,094,409 A | 3/1992 | King et al. | |
| 6,322,023 B1 * | 11/2001 | Soranno et al. | 244/159.4 |
| 6,439,508 B1 * | 8/2002 | Taylor | 244/158.3 |
| 6,689,952 B2 * | 2/2004 | Kawaguchi | 290/50 |
| 6,962,310 B1 * | 11/2005 | Bigelow | 244/158.1 |
| 7,100,874 B2 * | 9/2006 | Bigelow et al. | 244/158.3 |
| 7,108,228 B1 * | 9/2006 | Marshall | 244/158.1 |
| 2006/0016935 A1 * | 1/2006 | Jordan et al. | 244/159.4 |

* cited by examiner

*Primary Examiner*—J. Woodrow Eldred
*Assistant Examiner*—John W Eldred
(74) *Attorney, Agent, or Firm*—Franklin E. Gibbs

(57) ABSTRACT

A method for assembling and landing a habitable module on an extraterrestrial mass is claimed. At least one inflatable module and a second module are placed into orbit about an extraterrestrial mass. Connecting nodes, propulsion busses, and landing pads are also placed into orbit. A habitable structure is constructed from the modules, busses, pads, and nodes. The structure can be robotically constructed. The habitable structure is then landed onto the surface of the extraterrestrial mass. The landing can be remotely controlled and the modules can be non-occupied.

17 Claims, 5 Drawing Sheets

METHOD FOR ASSEMBLYING AND LANDING A HABITABLE STRUCTURE ON AN EXTRATERRESTRIAL BODY

BACKGROUND OF THE INVENTION

1. Field of the Invention

This invention relates to spacecraft and in particular to a method of assembling a structure in space and subsequently landing the space structure on an extraterrestrial body.

2. Description of the Prior Art

Many scenarios involving manned missions to the moon and other planets require landing a structure that can support human life. One issue with such extraterrestrial structures is the volume available for the inhabitants. The space within such a structure should accommodate living quarters, environmental support, storage, experimentation and instrumentation housing, to name just a few.

While large rigid structures may provide acceptable volume, these structures are expensive to deploy in space. Also, there is a practical limit as to the size of a rigid structure that can be launched into space based upon the size of the launch vehicle.

Another option is to launch a number of smaller rigid shelled modules to an extraterrestrial mass and assemble those modules into a larger structure on the surface of the celestial object. Several drawbacks to this approach are that it is expensive, time consuming, increases the likelihood of failure, and it most likely will require humans to participate in the construction of the shelter. This can expose the workers to substantial risk.

The environments of known extraterrestrial objects to date are inimical to human life. People must rely upon protective enclosures such as space suits to be ambulatory on the surface of the object. This extends to workers who would be assembling individual modules into a larger structure. It follows that if a person's protective space suit is damaged during the construction process, then the individual may suffer injury or death as a result.

One way to increase the volume of a deployed spacecraft and at the same time reduce the cost of deployment is to use inflatable modules. Inflatable spacecraft are known in the art as evidenced by U.S. Pat. No. 6,231,010 to Schneider, et al., and U.S. Pat. No. 6,547,189 to Raboin, et al. This type of craft is novel in that the shell is made of a generally pliable and flexible material as opposed to the solid shell of more traditional spacecraft.

The flexible shell allows the spacecraft to exist in one of two states. The first state is the pre-deployed state where the craft can be compressed to fit within the volume of a launch fairing. After launch and when the craft is released from the fairing, the vehicle can assume the second state or the deployed state. In this state, the craft is inflated to expand to many times the size of the pre-deployed volume.

Such modules have been proposed as the vehicle of choice for lunar and Mars manned missions. In these scenarios a module, or modules, would be landed on the surface of a planet. While this addresses the volume issue, it does not reduce the risk factor. In the case of multiple modules, human intervention would still be required to assemble the final structure and this process still exposes people to danger. This also exposes the project the chance of a failure to complete the construction.

What is needed is a method for deploying a large volume structure to an extraterrestrial object where the need to engage in construction on the surface of the object is substantially reduced if not eliminated. This includes the need for a more economical approach, a shorter term of construction, and a greater chance of completing the construction.

SUMMARY OF THE INVENTION

The present invention is directed to a method of assembling and landing a habitable structure on an extraterrestrial mass. An inflatable module is placed into orbit about the extraterrestrial mass along with at least one central node. A second module being an inflatable module or a rigid or substantially rigid module is placed into orbit about the extraterrestrial mass. A plurality of propulsion buses having a connecting node and landing pads are also placed into the orbit. The habitable structure is constructed by inflating the inflatable module and connecting it to the central node, attaching the second module, whether an inflatable module or a rigid or substantially rigid module to the central node, attaching the connecting node of a propulsion bus to each module, and connecting a plurality of landing pads on each propulsion bus. Next, the habitable structure is landed on the moon by remotely controlling the plurality of propulsion busses and landing pads as the habitable structure approaches the surface of the extraterrestrial mass.

DETAILED DESCRIPTION OF THE DRAWINGS

The present invention may best be understood by reference to the following description taken in conjunction with the accompanying drawings.

Figure 1:
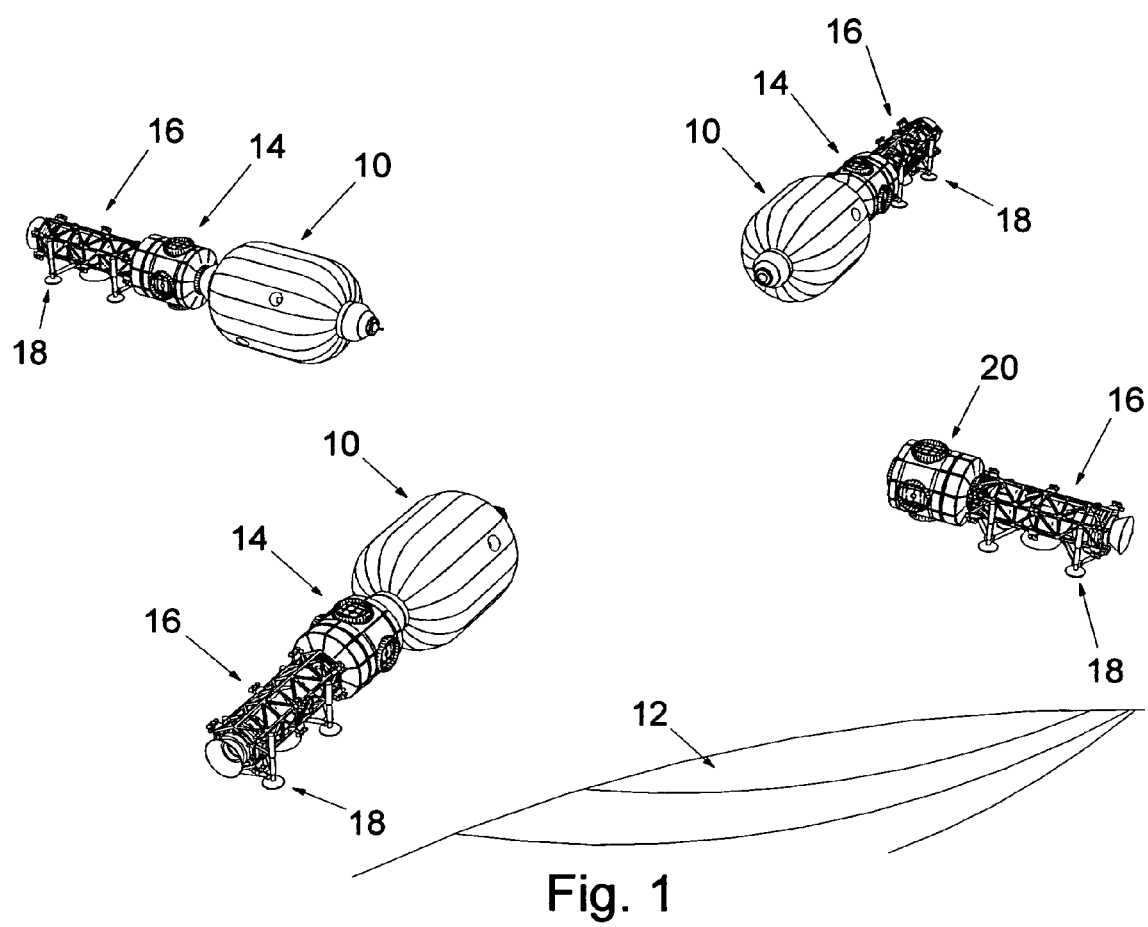
FIG. 1 is a perspective view of a plurality of inflatable modules in orbit about an extraterrestrial mass.

The process of compacting deploying and then inflating an inflatable module is known in the art. FIG. 1 depicts the preferred embodiment of three inflatable modules 10 in orbit about an extraterrestrial mass 12. A number of connecting nodes 14 are attached to the modules 10 and one connecting node acts as a central node 20 that is not initially attached to a module, but rather to a propulsion bus 16. Propulsion busses are well known in the art and serve to move spacecraft from one location to another location. Persons of skill in the art will appreciate the variety of ways connecting nodes, propulsion buses, and modules can be attached. Furthermore, alternate embodiments can have more or less than three modules. Also, alternate embodiments can include a mix of inflatable modules and rigid or substantially rigid space modules. In the general sense, a second module could be a substantially rigid or inflatable module.

The geometry of the modules, nodes, propulsion busses and landing pads are chosen such that the completed structure would be stable while the structure is descending to the surface of the extraterrestrial mass. Such choices are determinable my methods well known in the art.

Also present in FIG. 1 are a number of landing pads 18. The figure shows the landing pads 18 being connected to the propulsion buses 16. In alternate embodiments, the landing pads could also be attached to the connecting nodes 10 or modified to work directly with the modules 10. It will be appreciated by those skilled in the art as to the variety of landing pads that can be utilized in this application. These pads allow deployment on an uneven surface that otherwise might prevent completion.

The extraterrestrial mass 12 is a mass that can accommodate humans working within the modules.

Exemplary of extraterrestrial masses that could support the habitable structure of the present invention include the Moon, Mars, and larger asteroids, to name a just a few. The modules, busses, landing pads, and nodes are placed into orbit by means well known to those in the art. Such means includes, but is not limited to, the use of rocket boosters.

Figure 2:
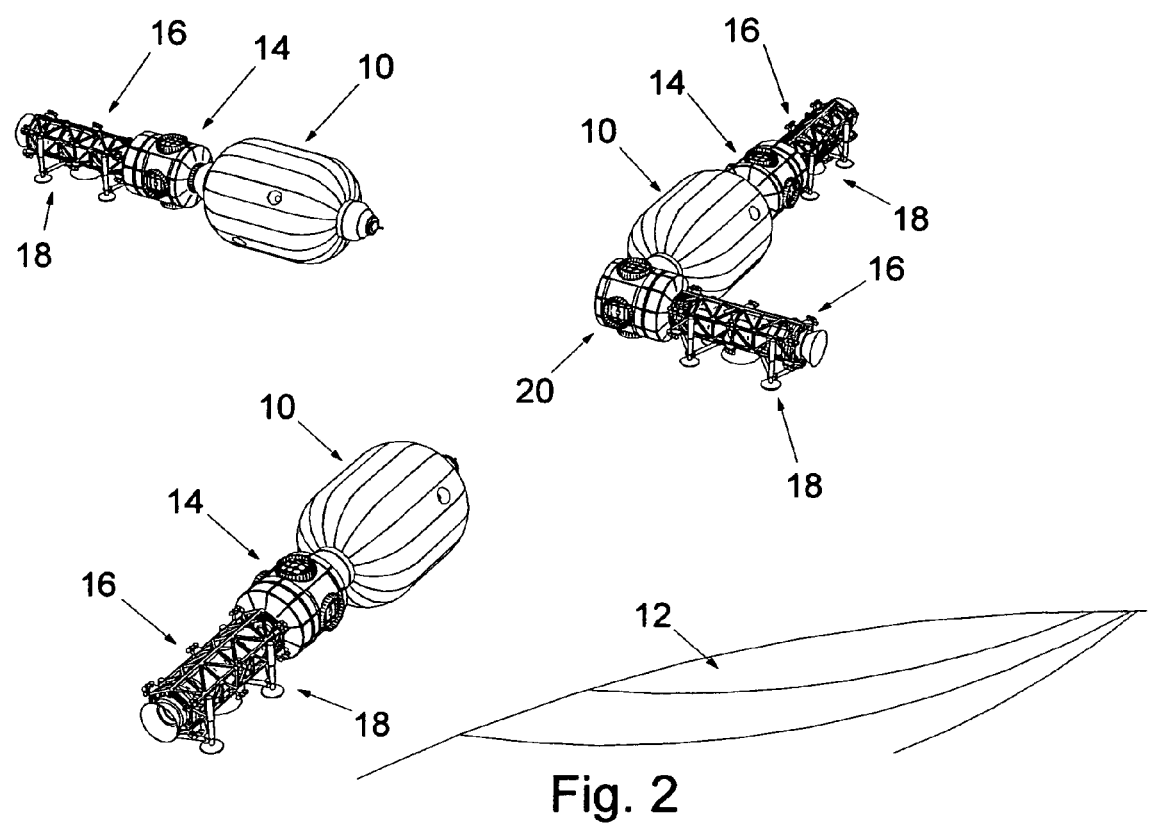
FIG. 2 is a perspective view of a connecting node attached to an inflatable module in orbit about an extraterrestrial mass.

Turning to FIG. 2, the modules are being brought together about the central node 20. The assembly of the habitable structure can be accomplished in a variety of ways. In the preferred embodiment the modules are first attached to a central node. Next, a node is connected to each propulsion bus and then to a module. Finally, the landing pads are attached to the space busses. Other embodiments can include attaching the modules, busses, pads, and nodes in a variety of different orders.

Figure 3:
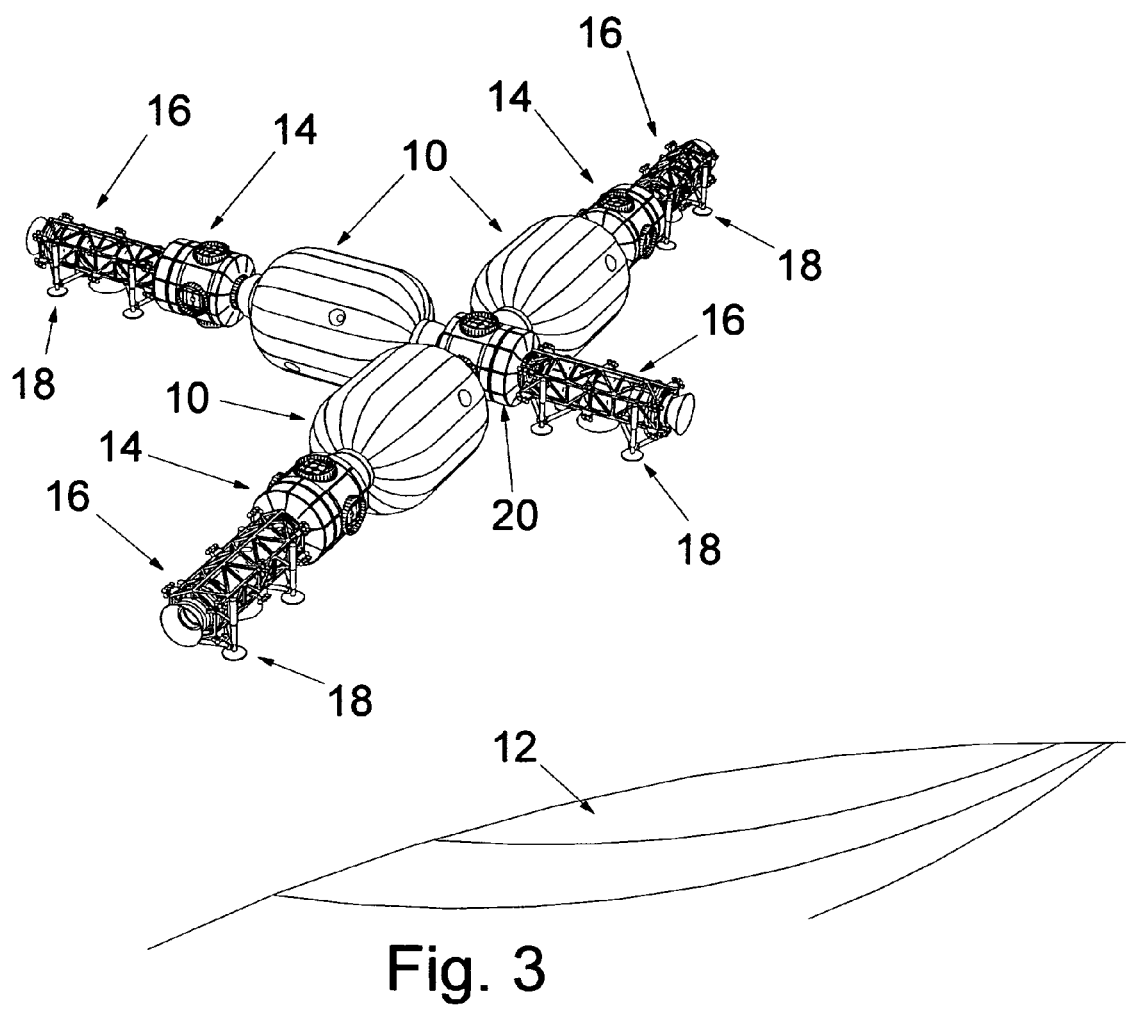
FIG. 3 is a perspective view of the constructed habitable structure.

FIG. 3 shows the modules 10 attached to the central node 20. This constitutes a pre-landing configuration where the habitable structure 22 is assembled for deployment to the surface of the extraterrestrial mass 12. Construction of the habitable structure 22 is accomplished by means that are known to those skilled in the art of space sciences.

Figure 4:
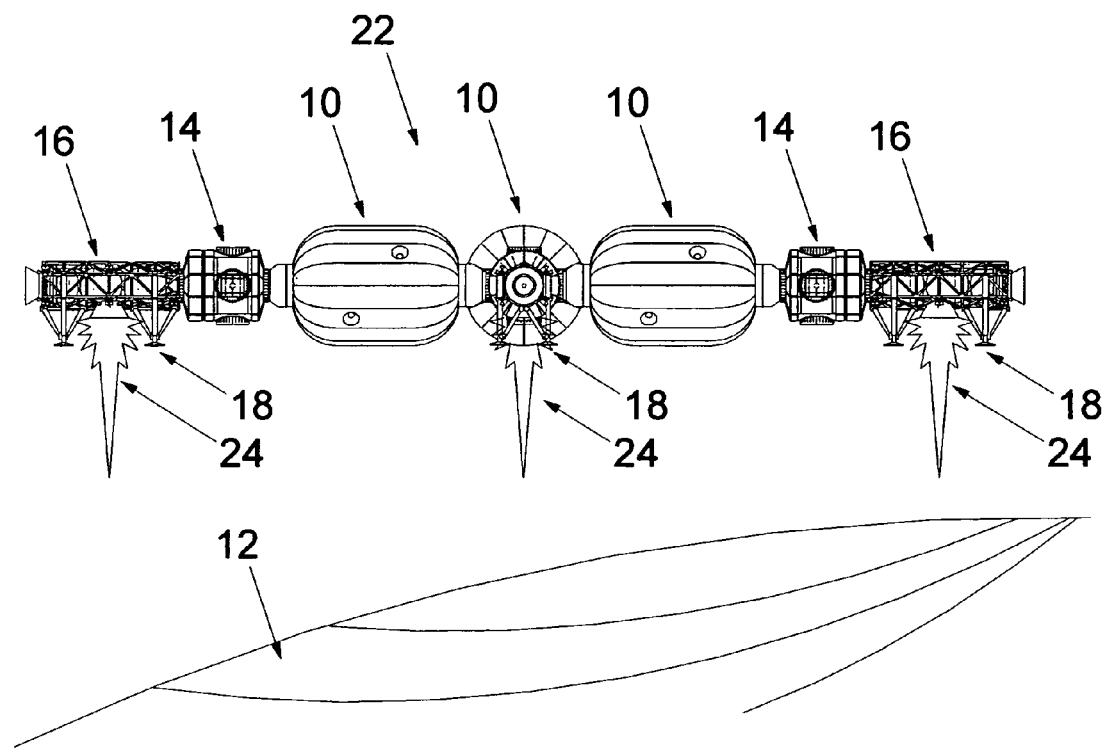
FIG. 4 is a perspective view of the habitable structure approaching an extraterrestrial mass for landing.

FIG. 4 depicts the assembled habitable structure 22 descending to the surface of the extraterrestrial mass 12. In this figure, the propulsion busses 16 are firing as illustrated by flames 24. The force exerted by the busses 16 slows the descent of the habitable structure 22 as it approaches the extraterrestrial mass 12. A person of skill in the art would be aware of a number of ways in which a propulsion bus could be fired to reduce the speed of a landing craft from a remote location.

Figure 5:
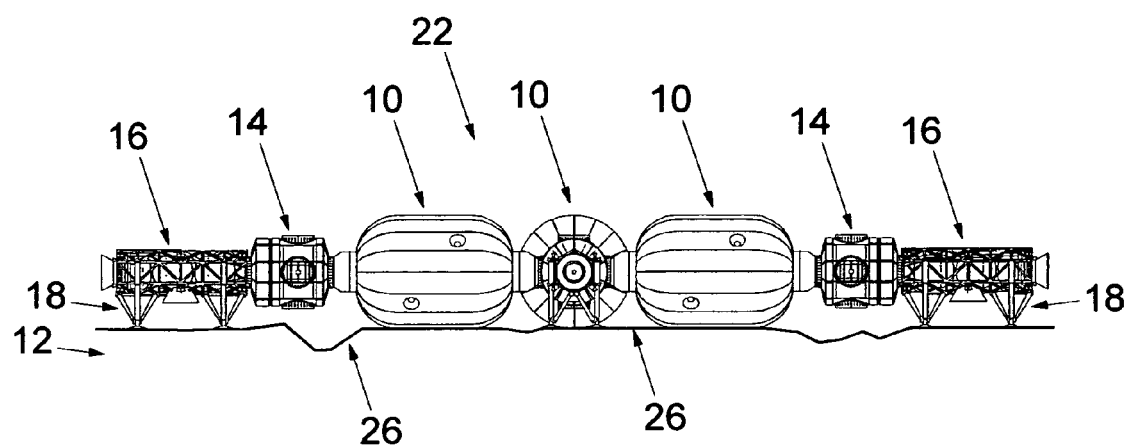
FIG. 5 is a perspective view of a landed habitable structure.

Finally, FIG. 5 illustrates the habitable structure 22 landed on the extraterrestrial mass 12. The figure illustrates how the landing pads 18 adjust to the incongruities in the surface of the mass 24. In this fashion, the habitable structure 22 is brought into a relatively level position. Another aspect of FIG. 5 illustrates how the individual inflatable modules 10 are in contact with the surface 24 of the mass. Due to the pressure in the module, the module can act as a sort of tire and absorb some of the force when in a landed posture. While this contact is part of the preferred embodiment, alternate embodiments can rely upon the landing pads to raise the modules off the surface of the extraterrestrial mass.

In the preferred embodiment, landing is accomplished by remote control. It will be appreciated by those of skill in the art that there are a variety of ways a remote control landing could be accomplished. The remote control can include remotely controlling the thrust produced by the propulsion busses and adjustment of the landing pads. Leveling of the habitable structure as it lands on the extraterrestrial mass can be accomplished by remote means.

A novel method for assembling and landing a habitable structure on an extraterrestrial mass has thus been described. It is important to note that many configurations can be constructed from the ideas presented. Thus, nothing in the specification should be construed to limit the scope of the claims. Further, the embodiments identified are not limiting as to the scope of the invention.

What is claimed is:

1. A method for assembling and landing a habitable structure having at least one inflatable module on an extraterrestrial mass, the method comprising the steps of:

placing a substantially rigid space module into orbit about the extraterrestrial mass;

placing an inflatable space module into orbit about the extraterrestrial mass;

inflating the inflatable space module in space;

placing at least one central node into orbit about the extraterrestrial mass;

placing a plurality of propulsion buses into orbit about the extraterrestrial mass;

placing a plurality of connecting nodes into orbit about the extraterrestrial mass;

placing a plurality of landing pads into orbit about the extraterrestrial mass;

constructing a habitable structure by connecting the substantially rigid space module to the central node, connecting the inflatable space module to the central node, attaching a connecting node to each propulsion bus and a connecting node being attached to an inflatable module, and a connecting node being attached to a substantially rigid module, and connecting a plurality of landing pads on each propulsion bus; and landing the habitable structure on the extraterrestrial mass by remotely controlling the plurality of propulsion busses and landing pads as the habitable structure approaches the surface of the extraterrestrial mass.

2. The method for landing a habitable structure on an extraterrestrial mass according to claim 1 wherein the extraterrestrial mass is the Moon.

3. The method for landing a habitable structure on an extraterrestrial mass according to claim 1 wherein the extraterrestrial mass is Mars.

4. The method for landing a habitable structure on an extraterrestrial mass according to claim 1 further including means for leveling the habitable structure.

5. The method for landing a habitable structure on an extraterrestrial mass according to claim 1 wherein the extraterrestrial mass is an asteroid.

6. A method for assembling and landing a habitable structure having an inflatable module, a substantially rigid space module, on an extraterrestrial mass, the method comprising the steps of:

placing the substantially rigid space module into orbit about the extraterrestrial mass;

placing at least one inflatable space module into orbit about the extraterrestrial mass;

inflating the inflatable space module in space;

placing at least one central node into orbit about the extraterrestrial mass;

placing a plurality of propulsion buses into orbit about the extraterrestrial mass;

placing a plurality of connecting nodes into orbit about the extraterrestrial mass;

placing a plurality of landing pads into orbit about the extraterrestrial mass;

constructing a habitable structure by connecting the substantially rigid space module to the central node, connecting the inflatable space module to the central node, attaching a connecting node to each propulsion bus a connecting node being attached to an inflatable module, and a connecting node being attached to a substantially rigid module, and connecting a plurality of landing pads on each propulsion bus; and landing the habitable structure on the extraterrestrial mass by remotely controlling the plurality of propulsion busses and landing pads as the habitable structure approaches the surface of the extraterrestrial mass.

7. The method for landing a habitable structure on an extraterrestrial mass according to claim 6 wherein the extraterrestrial mass is the Moon.

8. The method for landing a habitable structure on an extraterrestrial mass according to claim 6 wherein the extraterrestrial mass is Mars.

9. The method for landing a habitable structure on an extraterrestrial mass according to claim 6 further including means for leveling the habitable structure.

10. The method for landing a habitable structure on an extraterrestrial mass according to claim 6 wherein the extraterrestrial mass is an asteroid.

11. A method for assembling and landing a habitable structure having at least two inflatable modules on an extraterrestrial mass, the method comprising the steps of:
    placing at least two inflatable space modules into orbit about the extraterrestrial mass;
    inflating the inflatable space modules in space;
    placing at least one central node into orbit about the extraterrestrial mass;
    placing a plurality of propulsion buses into orbit about the extraterrestrial mass;
    placing a plurality of connecting nodes equal to the number of propulsion busses into orbit about the extraterrestrial mass;
    placing a plurality of landing pads into orbit about the extraterrestrial mass;
    constructing a habitable structure by connecting the inflatable space modules to the central node, attaching a connecting node to each propulsion bus and a connecting node being attached to each inflatable module, and connecting a plurality of landing pads on each propulsion bus; and
    landing the habitable structure on the extraterrestrial mass by remotely controlling the plurality of propulsion busses and landing pads as the habitable structure approaches the surface of the extraterrestrial mass.

12. The method for landing a habitable structure on an extraterrestrial mass according to claim 11 wherein the extraterrestrial mass is the Moon.

13. The method for landing a habitable structure on an extraterrestrial mass according to claim 11 wherein the extraterrestrial mass is Mars.

14. The method for landing a habitable structure on an extraterrestrial mass according to claim 11 further including means for leveling the habitable structure.

15. The method for landing a habitable structure on an extraterrestrial mass according to claim 11 wherein the extraterrestrial mass is an asteroid.

16. A method for assembling and landing a habitable structure having at least one inflatable module on an extraterrestrial mass, where the inflatable module, a second module, central node, at least two connecting nodes where each connecting node is attached to propulsion bus and each propulsion bus has a plurality of landing pads attached, are placed into orbit about an extraterrestrial mass, the method comprising the steps of:
    inflating the inflatable space module in space;
    constructing a habitable structure by connecting the second module to the central node, connecting the inflatable space module to the central node, attaching a connecting node to the inflatable module, and attaching a connecting node to the second module; and
    landing the habitable structure on the extraterrestrial mass by remotely controlling the plurality of propulsion busses and landing pads as the habitable structure approaches the surface of the extraterrestrial mass.

17. A method for assembling and landing a habitable structure on an extraterrestrial mass, the method comprising the steps of:
    placing an inflatable space module into orbit about the extraterrestrial mass;
    placing a second space module into orbit about the extraterrestrial mass;
    inflating the inflatable space module in space;
    placing at least one central node into orbit about the extraterrestrial mass;
    placing a first and second propulsion bus into orbit about the extraterrestrial mass;
    placing a first and second connecting node into orbit about the extraterrestrial mass;
    placing a plurality of landing pads into orbit about the extraterrestrial mass;
    constructing a habitable structure by connecting the inflatable space module to the central node, connecting the second space module to the central node, attaching the first connecting node to first propulsion bus, connecting the first connecting node to the inflatable space module, connecting the second propulsion bus to the second connecting node, connecting the second connecting node to the second space module, and connecting a plurality of landing pads on each propulsion bus; and
    landing the habitable structure on the extraterrestrial mass by remotely controlling the plurality of propulsion busses and landing pads as the habitable structure approaches the surface of the extraterrestrial mass.

* * * * *